US006629134B2

(12) United States Patent
Hayward et al.

(10) Patent No.: US 6,629,134 B2
(45) Date of Patent: Sep. 30, 2003

(54) CONTEXT SENSITIVE WEB-BASED USER SUPPORT

(75) Inventors: Ken Hayward, Brockport, NY (US); Marc J. Krolczyk, Rochester, NY (US); Dawn M. Marchionda, Marion, NY (US)

(73) Assignee: Xerox Corporation, Stamford, CT (US)

( * ) Notice: Subject to any disclaimer, the term of this patent is extended or adjusted under 35 U.S.C. 154(b) by 8 days.

(21) Appl. No.: 09/397,125

(22) Filed: Sep. 16, 1999

(65) Prior Publication Data

US 2003/0023703 A1 Jan. 30, 2003

(51) Int. Cl.$^7$ .............................................. G06F 15/16
(52) U.S. Cl. .................. 709/217; 709/220; 709/224; 710/8; 399/8; 399/10; 399/24; 399/27; 399/49
(58) Field of Search .................. 709/217, 203, 709/224, 220; 703/24; 705/21; 713/200, 201; 710/8; 347/50; 399/8, 10, 24, 27, 49

(56) References Cited

U.S. PATENT DOCUMENTS

| | | | |
|---|---|---|---|
| 4,496,237 A | 1/1985 | Schron | 399/81 |
| 4,961,088 A | 10/1990 | Gilliland et al. | 399/25 |
| 5,016,171 A | 5/1991 | Connolly et al. | 714/1 |
| 5,281,999 A | 1/1994 | Edmunds | 399/119 |
| 5,283,613 A | 2/1994 | Midgley, Sr. | 399/9 |
| 5,305,199 A | 4/1994 | Frick | 355/77 |
| 5,572,292 A | 11/1996 | Chatani et al. | 399/25 |
| 5,636,032 A | 6/1997 | Springett | 358/296 |
| 5,794,094 A | 8/1998 | Boockholdt et al. | 399/27 |
| 5,799,157 A | 8/1998 | Escallon | 705/27 |
| 5,802,420 A | 9/1998 | Garr et al. | 399/27 |
| 5,809,375 A | 9/1998 | Owens, Jr. et al. | 399/111 |
| 5,828,864 A | * 10/1998 | Danknick et al. | 703/24 |
| 5,835,817 A | 11/1998 | Bullock et al. | 399/25 |
| 5,896,497 A | * 4/1999 | Halstead | 318/254 |
| 5,901,286 A | 5/1999 | Danknick et al. | 709/203 |
| 5,968,138 A | * 10/1999 | Clough | 710/8 |

(List continued on next page.)

FOREIGN PATENT DOCUMENTS

| | | |
|---|---|---|
| EP | 0 838 768 A2 | 4/1998 |
| EP | 0 843 229 A2 | 5/1998 |
| WO | WO 99/06910 | 2/1999 |
| WO | WO 99/17210 | 4/1999 |

OTHER PUBLICATIONS

IBM Technical Disclosure Bulletin—"Disk Drive with Embedded Hyper–Text Markup Language Server"; vol. 38, No. 12, Dec. 1995.
Search report dated May 6, 2002 for Application 00307970.4–1238 (4 pages).
IDOC's Linking the Worlds of Print and Electronic Media, Sep. 11, 1998.

*Primary Examiner*—Kenneth R. Coulter
*Assistant Examiner*—Hai Nguyen
(74) *Attorney, Agent, or Firm*—Andrew D. Ryan

(57) ABSTRACT

A method of providing support to a user of a computer peripheral includes sensing a peripheral indicia at a computer and registering the peripheral and downloading from a server additional information about the peripheral based on the peripheral indicia. The peripheral indicia includes any of a model number, a part number, a serial number, a date of manufacturer and a configuration indicia. Registering the peripheral is performed by launching a communications browser to connect to the server. The method also senses a peripheral condition at the computer where the peripheral condition includes either an error code or a code indicative of a consumable reaching a predetermined threshold or both. This method accesses the server at an address defined by the peripheral condition, and the server provides the browser with additional information about the peripheral condition.

15 Claims, 6 Drawing Sheets

U.S. PATENT DOCUMENTS

| | | | | |
|---|---|---|---|---|
| 5,983,369 A | * | 11/1999 | Bakoglu et al. | 714/46 |
| 5,999,761 A | | 12/1999 | Binder et al. | 399/49 |
| 6,000,773 A | | 12/1999 | Murray et al. | 347/7 |
| 6,003,078 A | * | 12/1999 | Kodimer et al. | 709/224 |
| 6,005,579 A | * | 12/1999 | Sugiyama et al. | 345/855 |
| 6,016,409 A | | 1/2000 | Beard et al. | 399/33 |
| 6,018,719 A | * | 1/2000 | Rogers et al. | 705/21 |
| 6,023,593 A | | 2/2000 | Tomidokoro | 399/8 |
| 6,045,206 A | | 4/2000 | Igval | 347/2 |
| 6,065,824 A | | 5/2000 | Bullock et al. | 347/19 |
| 6,106,088 A | | 8/2000 | Wafler | 347/7 |
| 6,141,507 A | | 10/2000 | Sawada | 399/8 |
| 6,151,707 A | * | 11/2000 | Hecksel et al. | 717/178 |
| 6,158,837 A | | 12/2000 | Hilton et al. | 347/19 |
| 6,170,007 B1 | | 1/2001 | Venkatraman et al. | 709/218 |
| 6,233,408 B1 | | 5/2001 | Allen | 399/8 |
| 6,233,409 B1 | | 5/2001 | Haines et al. | 399/10 |
| 6,264,301 B1 | | 7/2001 | Helterline et al. | 347/19 |
| 6,271,928 B1 | | 8/2001 | Bullock et al. | 358/1.16 |
| 6,289,371 B1 | * | 9/2001 | Kumpf et al. | 709/203 |
| 6,293,144 B1 | | 9/2001 | Froger et al. | 73/304 C |
| 6,295,423 B1 | | 9/2001 | Haines et al. | 399/24 |
| 6,302,527 B1 | | 10/2001 | Walker | 347/50 |
| 6,312,106 B1 | | 11/2001 | Walker | 347/50 |
| 6,321,258 B1 | * | 11/2001 | Stollfus et al. | 709/220 |
| 6,333,790 B1 | | 12/2001 | Kageyama | 358/1.15 |

* cited by examiner

CONTEXT SENSITIVE WEB-BASED USER SUPPORT

Reference is made to commonly-assigned copending U.S. patent application Ser. No. 09/662,284, filed Sep. 14, 2000, entitled Method for Supply Ordering, by Ken Hayward, et al; commonly-assigned U.S. patent application Ser. No. 09/662,198, filed Sep. 14, 2000, entitled Supply Ordering Apparatus, by Ken Hayward, et al; commonly-assigned U.S. patent application Ser. No. 09/397,126, filed Sep. 16, 1999, entitled Context Sensitive Web-Based Supply Ordering, by Ken Hayward, et al; commonly-assigned U.S. patent application Ser. No. 09/740,603, filed Dec. 19, 2000, entitled System for Providing Information for a Customer Replaceable Unit, by Karl E. Kurz, et al; commonly-assigned U.S. patent application Ser. No. 10/045,865, filed Oct. 29, 2001, entitled System for Providing Information for a Customer Replaceable Unit, by Karl E. Kurz, et al; and commonly-assigned U.S. patent application Ser. No. 09/740,505, filed Dec. 19, 2000, entitled Method for Providing Information for a Customer Replaceable Unit, by Karl E. Kurz, et al.

BACKGROUND OF THE INVENTION

1. Field of the Invention

The present invention relates to web based user support for a computer peripheral. In particular, the invention relates to a computer program that responses to a particularized sensed condition in a peripheral by accessing a corresponding particularized URL (universal resource locator) address.

2. Description of Related Art

Personal computers and their peripherals are now affordable to small offices and home offices (SOHO) resulting in a large number of computers and computer peripherals installed at diverse locations. The operators of these SOHO computers, in general are less experienced in the repair and maintenance of computers and peripherals than they are in the practice their particular trade or business (e.g., carpet installer, accountant, etc.). Therefore, many manufacturers of computers and peripherals provide toll free "hot line" telephone numbers (e.g., 800 numbers) so a SOHO computer operator can call for help. This is an economic burden on the manufacturer.

Manufacturers typically maintain a database of information to support the repair and maintenance of their products. A SOHO computer operator, or even a professional computer technician, can call a help line to speak to an operator that accesses the database to answer particularized questions (e.g., "how do I change an ink cartridge?"). Manufacturers have prepared user friendly computer interfaces so their help line operators can easily access the requested information (e.g., by product type, detected error condition, etc.).

Some manufactures have built their database in an HTML format (hypertext markup language format) that may be accessed over the Internet by a browser in a computer. HTML is a format that is widely used to present information at Internet web sites. However, finding the correct HTML formatted page still requires a skilled operator. Some web sites are designed with better navigation aids (i.e., linking "buttons") than other sites. However, a minimum familiarity with web pages and links is still required.

Known computer peripherals (e.g., a combination fax, copier, printer and scanner workstation) provide some user assistance as part of the peripheral itself. At a minimum, the peripheral will have some lights (e.g., light emitting diodes known as LEDs or equivalent) that indicates one or more error conditions). More common is a small LCD (liquid crystal display) that indicates a wider variety of error conditions. Typically, a user reads an error code from the LCD, looks up the error code in a peripheral user's manual, and then calls the manufacturer's toll free help line for an explanation of the code or instructions on what to do to fix the problem.

FIG. 1 depicts a typical known peripheral 10 connected to a known computer 30 over a bus 32. Peripheral 10 includes sensors 12 to detect conditions (e.g., paper tray empty). Sensors 12 and machine state flags 14 (e.g., warm up or not ready) describe the state of the machine. Firmware 16 reads the state of the machine and forms an error code number. Code handler 22 of user interface 20 receives the error code and causes it to be displayed on status monitor 24 of user interface 20.

SUMMARY OF THE INVENTION

It is an object to the present invention to provide enhanced user support information. It is a further object of the present invention to automatically access the enhanced user support information using a server address defined by a peripheral indicia and by a peripheral condition.

These and other objects are achieved in a method that provides support to a user of a computer peripheral that includes sensing a peripheral indicia and a peripheral condition at a computer and registering the peripheral and downloading from a server additional information about the peripheral based on the peripheral indicia and the peripheral condition. The peripheral indicia includes any of a model number, a part number, a serial number, a date of manufacturer and a configuration indicia and the peripheral condition includes either an error code or a code indicative of a consumable reaching a predetermined threshold or both. Registering the peripheral is performed by launching a communications browser to connect to the server. This method accesses the server at an address defined by the peripheral condition, and the server provides the browser with additional information about the peripheral condition.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
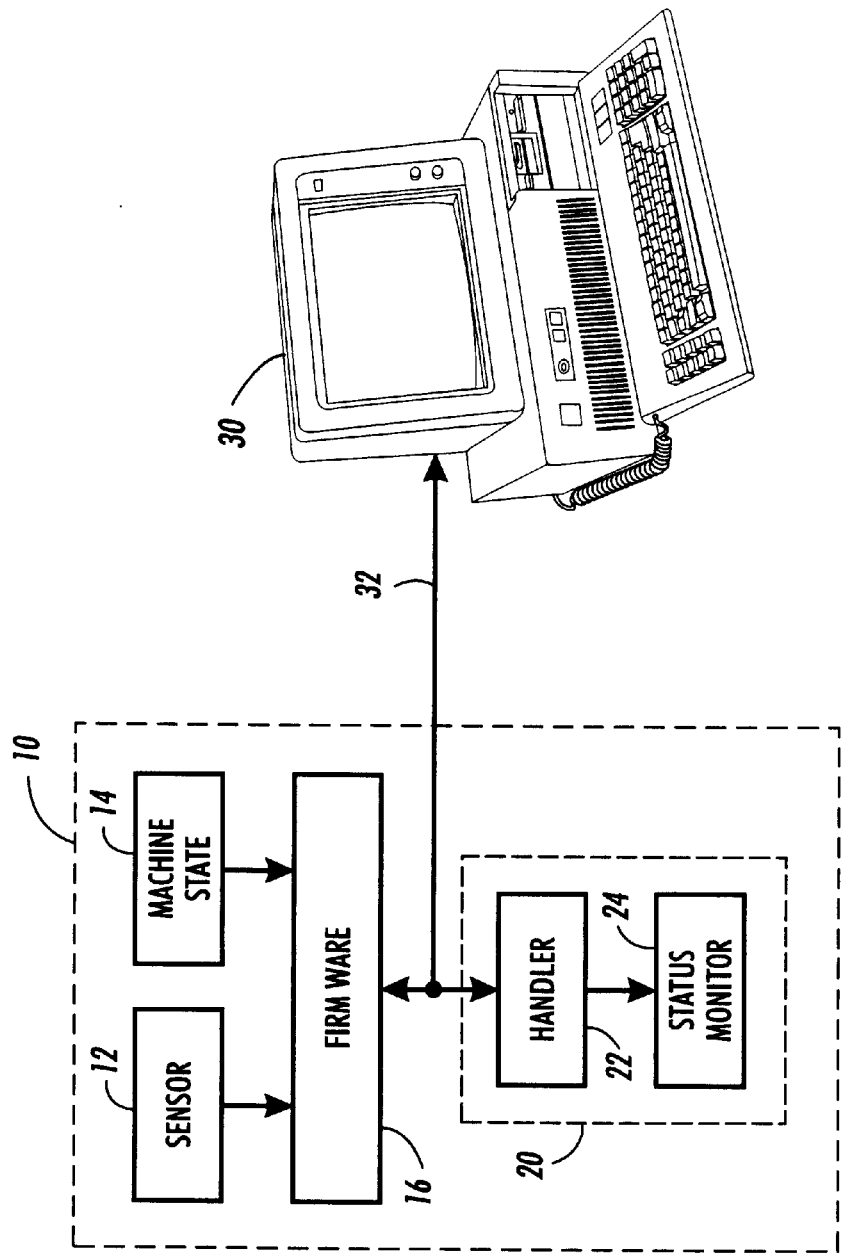
FIG. 1 is a block diagram of a user interface of a known computer peripheral.
Figure 2:
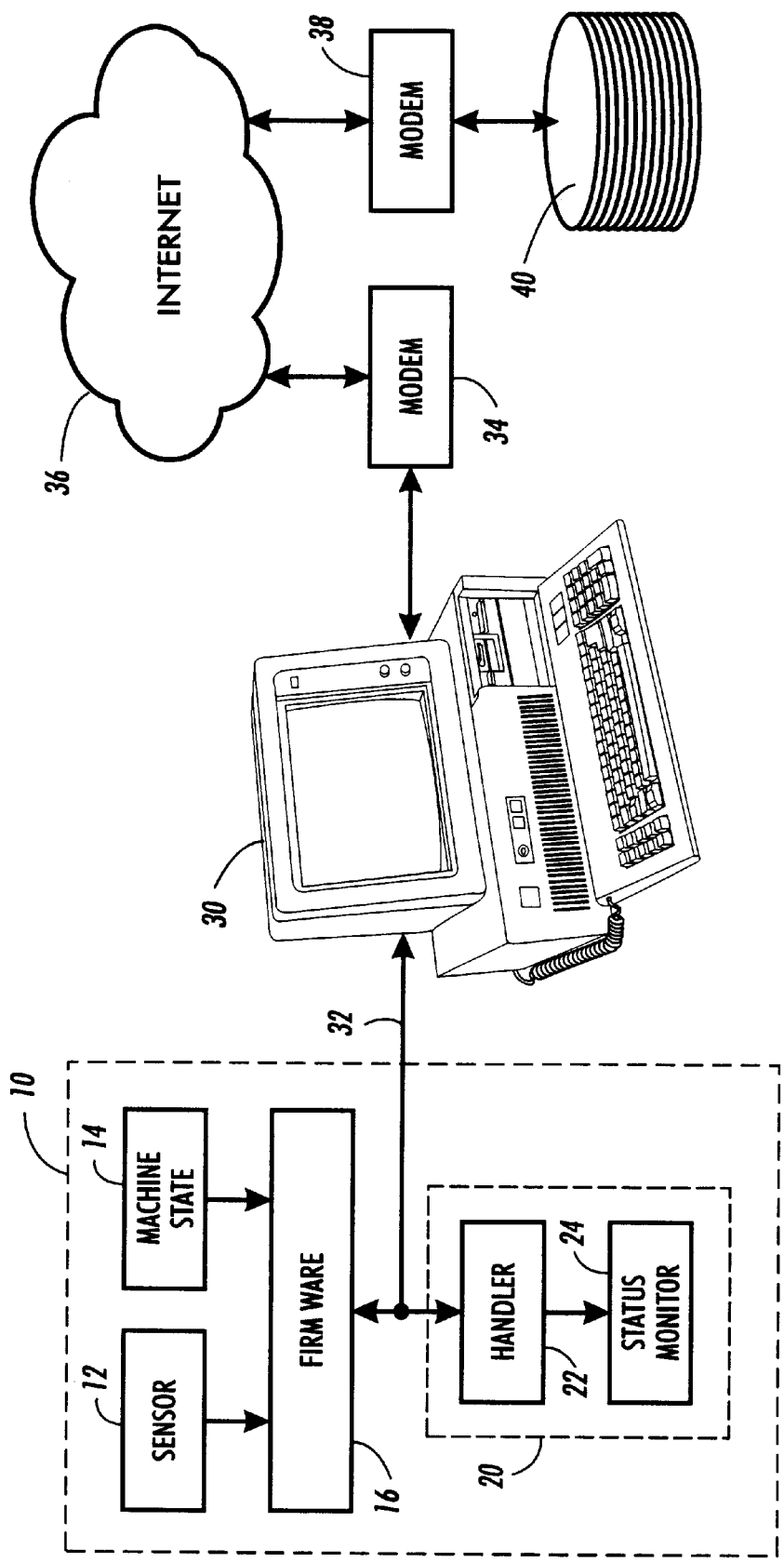
FIG. 2 is a block diagram of a user support system according to the present invention.

In FIG. 2, SOHO computer 30 includes modem 34 to convert computer binary information to analog telephone signals. In this way the SOHO user may be connected to Internet 36. Computer 30 has installed and operating thereon an Internet browser (i.e., a software module that runs on the SOHO computer to interface the user to the Internet).

Internet 30, as depicted in FIG. 2, is any suitable communications system. Presently, Internet access services are often provided by Internet Service Providers (ISPs). Typically, an ISP maintains a point of presence (POP) in the user's local telephone system to give the user a local telephone number to call. In this case, modem 30 is a telephone modem, and under user control the browser causes modem 34 to place a call to the POP. The POP is linked to the IPS's main service center by trunk lines in one form or another. The ISP's main service center has a bank of modems (not shown) to reconvert the analog telephone signals into computer binary information, and a computer (also not shown) in one form or another to connect to the Internet backbone (a digital or binary communications system, also not specifically shown). The Internet backbone includes an Internet pier (i.e., terminal) where properly formatted digital signals from the ISPs main service center are launched onto the Internet backbone. The user, through his browser, may access any site on the Internet based on a URL. Everything from the POP to the Internet backbone is covered by the representation of Internet 30 in FIG. 2.

Other communications protocols may be used and are equivalent. For example, ISDN (integrated services digital network) is a widely used high speed communication protocol. DSL (digital subscriber line) is a newer protocol that is still growing in acceptance. Cable telephone systems are establishing special "cable modems" as an alternative to a telephone modem. A cable modem communicates with a headend of a cable system where the communication is routed through a trunk to an Internet pier, either directly or indirectly through an ISP. These or other protocols may be used to link modem 34 (FIG. 2) to the Internet.

Separate and apart from the Internet, a peripheral manufacturer owns or leases server 40 connected to the Internet through modem 38. Modem 38 connects to the Internet either directly or indirectly through an ISP. Server 40 performs a variety of functions for the manufacturer from registering a new purchaser of a peripheral to publishing information about the peripheral.

A peripheral (e.g., a combination fax, copier, printer and scanner workstation) is sold to the user with installation software. The user physically connects peripheral 10 to computer 30, then loads and executes the installation software. The installation software loads on the computer an application program that may be executed directly by the user to perform tasks with the peripheral, and one or more driver modules (e.g., a printer driver) that may be executed by another application program (e.g., a word processor) to perform tasks for the, for example, word processor.

The installation software may include and execute a module to perform online registration. Online registration systems use a registration server at the manufacturer's plant to provide the user with HTML formatted pages over the Internet for display on computer 30. These pages include blank fields to be filled out by the user. For example the fields may require the user's name and the product name and model. The HTML formatted page also includes a "send button" to be "clicked on" by the user to send the filled out fields to the registration server in order to complete the online registration.

Figure 5:
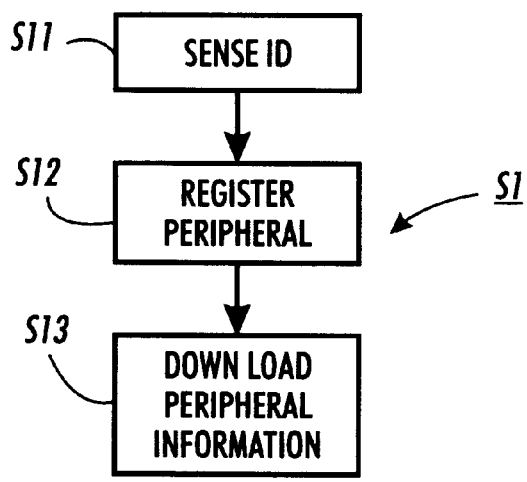
FIG. 5 is a flow chart of a registration process of the invention.

Uniquely, the present invention senses a peripheral indicia at computer 30 (step S11 of FIG. 5). The indicia includes any of a model or part number, a date of manufacture, a serial number and even configuration information for peripherals that may have diverse reconfigurable parts.

Then the process of registering the peripheral (step S12, FIG. 5) launches a communications browser to connect to the registration server. The registration page is displayed on the screen and the user fills out the information fields (e.g., the user name) and clicks on the send button. The user filled out fields and the exact peripheral indicia are sent to the registration server. This results in a precise configuration and date of the registered product being stored on the registration server.

At the end of online registration process S1, a file of additional information directed to the registered peripheral is downloaded from the server. The downloaded information is dependent on the peripheral indicia. In this way the latest information on the registered peripheral may be stored in computer 30, and the information is directed to the precise configuration and date of the registered product.

At product launch, the manufacture prepares user support information in either printed form to ship with the product or in an electronic data file to be installed with the installation software to be later accessed from a help menu. In either case, the manufacturer uses its best judgement of what information is needed by the users. There is a balance between providing too much information (taking up memory space or requiring big printed books) and too little information making it necessary for a user to call the manufacturer's help line too often.

Even with the best judgement at product launch, users ask questions after product launch. The manufacture tracks the help line inquires and prepares a list of frequently asked questions with their answers. However, the manufacturer needs an efficient way to published this information to the registered users in a timely manner. After many months or years of sales of a successful peripheral product, the frequently asked questions or other support information may become quite large.

Some of this information may be published on an Internet web site, but this means the information is broadcasted to the general public as well as new and old customers who bought the peripheral but with different configurations. Potential new customers will need only information about the most recent configuration of the product, although support could be provided for a used equipment market. Customers who recently bought the peripheral will have an updated product that will not need access to some or all of the frequently asked questions that apply to older versions of the peripheral. Many customers who are buying a product under a stable product name may not be aware that there may be revisions and upgrades made to the product during the product cycle, and that there is often a significant configuration evolution during the product's life cycle. A single web site for the product by product name does not address these configuration changes during the product's life cycle.

However, using the present invention, the specific peripheral indicia is used to identify the specific user support information that is useful to the operation and maintenance of the particular peripheral having the particular serial number or configuration.

Even so, after the initial registration of the peripheral, the user support information (e.g., frequently asked questions) may be amplified. For example, early in the product's life cycle, an unanticipated and large number of calls may be received on the toll free help line dealing with a particular issue. Help line operators respond to the user inquiries, and report the issue to persons who maintain databases for user support. A person maintaining the databases may add one or more frequently asked questions and reply. In this way the user support information continues to evolve throughout the product's life cycle.

The present invention permits a user to update the user support information stored in computer 30 at any time. Using the peripheral indicia ensures that only the support information needed to support the particular product is downloaded from the manufacturer's server (40, FIG. 2).

During the operation of the peripheral, error conditions may occur or peripheral conditions may occur that indicate a need to replace a consumable (e.g., paper tray empty, or out of ink). A peripheral condition is derived from sensors 12 and machine state 14 in firmware 16. The peripheral condition is sent by firmware 16 over bus 32 to an application program running in computer 30. The applications program will indicate the condition to the computer user, for example with an X on the display screen.

Figure 3:
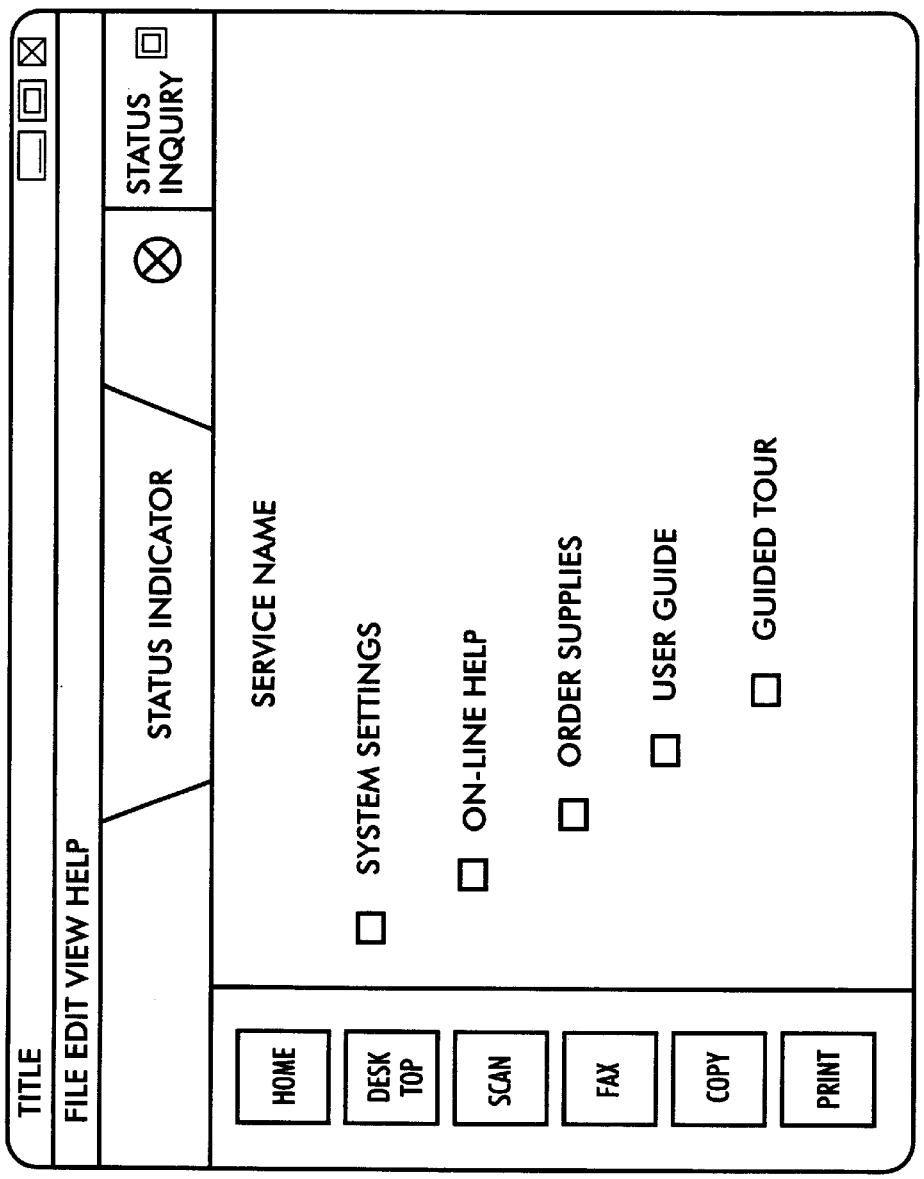
FIG. 3 is a view of a "home" screen display of an embodiment of the invention.

FIG. 3 depicts a generalized display screen for the exemplary combination fax, copier, printer, scanner work station. Along the top line is the title of the application program, for example, "SOHO WorkStation". The next line is a known type of drop down menu bar. The next line includes information specific to the present exemplary work station. The first three lines are common to all screen displays of the application program. The third line, for example, includes an X indicator to indicate that a status condition has occurred that should be reviewed, and a Status Inquiry box with "button" to "click on" and get more status information. On the left hand side is a vertical bar with six buttons that is referred to as a service panel and it appears in most of the screens of the application program. The remaining portion of the screen is a work area that is context sensitive and dependent on the selected service.

In the service panel there are six buttons. The first button always returns to the home menu screen. The next button accesses a "desktop" directory for use by the present application. The next four buttons, in succession, access the scanner screen, the fax screen, the copier screen and the printer screen.

Five menu choices are depicted in the context sensitive work area of the home screen. The first menu entry accesses a screen to review or modify system settings. The system setting screen provides for setting up all device settings that would otherwise need to set up with hard buttons, and preferably includes a link to maintenance and print driver setup screens. The second menu entry in the home screen accesses a screen to access toll free online help services and user support as described further herein. The third menu entry of the home screen accesses a screen to order supplies and/or upgrades from the manufacturer or an manufacturer approved supplier. The fourth menu entry of the home screen accesses a digital user manual with hyperlinked information and help files. The fifth menu entry in the home screen accesses a simplified guided tour and interactive demonstration of the peripheral's operation.

Figure 4:
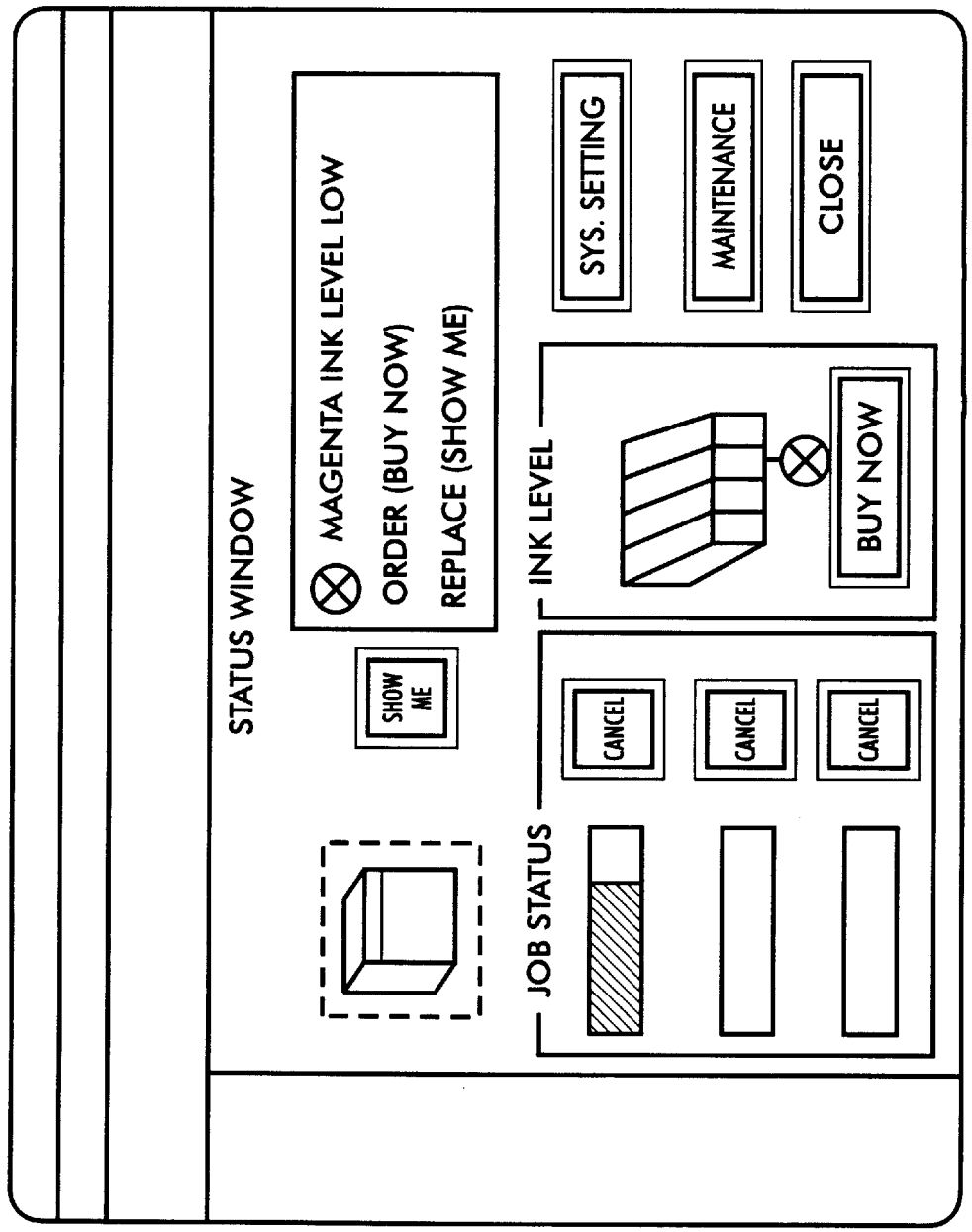
FIG. 4 is a view of a "status window" of a screen display of an embodiment of the invention.

FIG. 4 depicts the work area (i.e., status window) of the status screen. When the status inquiry button is clicked from home screen (or any other screen), the status window appears. The top of the status window includes two areas in the upper half: an icon display of the peripheral so the user has a comfort feeling that the status is about his peripheral and a peripheral condition sub-window with a "show me" button between. As depicted in FIG. 4, a peripheral condition is indicated by the X, the condition explained as a "Magenta Ink Level Low" condition, and two options are given. The first option is ordering another magenta ink cartridge using the "Buy Now" button, and the second option is replacing the cartridge using the "Show Me" button.

The bottom of the status window includes three areas in the lower half: a job status sub-window, an ink level sub-window with a "Buy Now" button, and three miscellaneous buttons (system settings as a short cut to change settings, maintenance button to access a diagnostics screen and a close button). The job status sub-window shows three jobs as an example, showing the portion completed. Preferably, some indicia of the job, such as a file name, would be displayed under the portion completed. Next to each job is a cancel button to permit the user to optionally cancel the job.

It should be appreciated that the screens depicted in FIGS. 3 and 4 are representive of a best mode of the screen embodiments, but these screen formats do not limit in any way the invention defined by claims.

Figure 6:
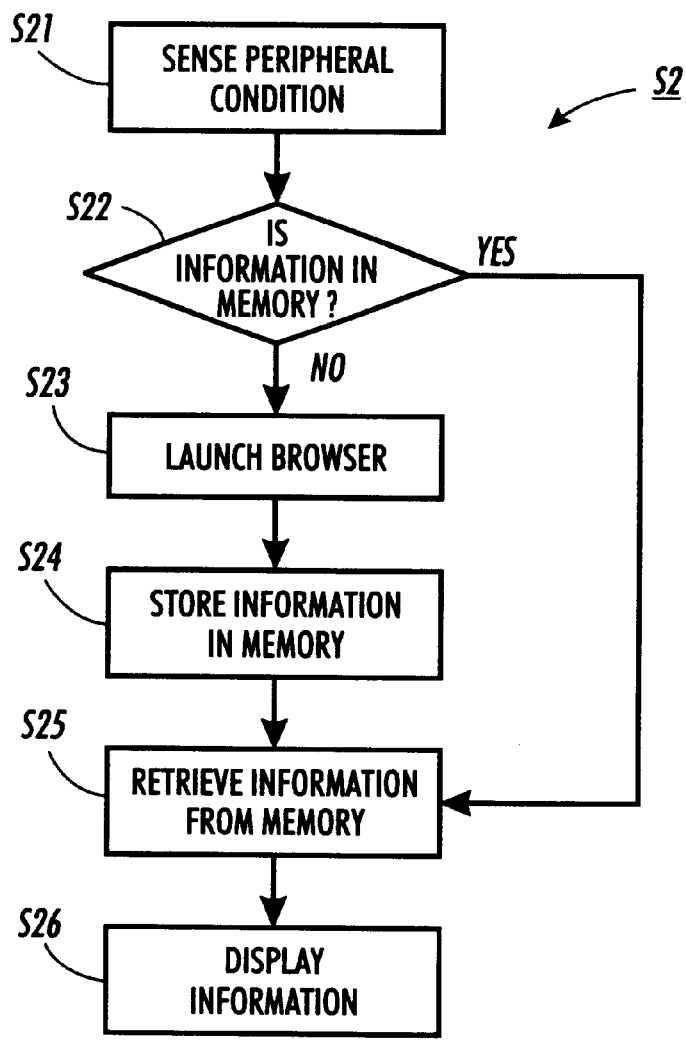
FIG. 6 is a flow chart of a user support information update process of the invention.

When a user accesses the status window and clicks the "show me" button, the application program will access replacement instruction information related to replacing the magenta ink cartridge. FIG. 6 depicts this show me process as step S2. In step S21, the application program senses the particular peripheral condition. The application program running in computer 30 receives the peripheral condition over bus 32 from firmware 16 (FIG. 2). In step S22 (FIG. 6), the application program checks to see if the information is already present in the memory of computer 30. If the information is not present, the application program in step S23 launches an embedded or an external communications browser to access the manufacturer's server at an address defined by the peripheral condition. For example, the address might be:

www.manufacturer.com/product/xxx, where "product" is the peripheral indicia or something derivative therefrom, and "xxx" is the peripheral condition (i.e., magenta ink level low) or something derivative therefrom.

The browser accesses a web page on the manufacturer's server that is identified by "/product/xxx". In this way the information provided is not only specific to the product configuration of the peripheral as it exist in the product's life cycle, but is also specific to the particular peripheral condition sensed. Then, the server provides the browser with additional information about the peripheral condition which is stored temporarily in the computer's memory (step S24, FIG. 6). The additional information may be text, but preferably includes illustrations and even photographs. It may include audio clips (e.g., using .wav format) and it may include video segments using any of the available formats. A goal is to make it look to the user as if a technician on the other side of the computer screen is showing the user how to replace the magenta cartridge in the user's specific machine.

Audio and video clips require large storage areas. While it may be possible to store in the computer's memory a complete audio and video clip for several conditions, it is unlikely that all possible conditions will be economically storable in the computer's memory. However the manufacturer's server, server 40 in FIG. 2, is much larger and may include clips for all possible conditions, for each configuration of each product line that is supported.

In step S25, the additional information is retrieved from memory and in step S26 displayed to the user. It should be appreciated that the memory of computer 30 may include an area that is to be used to save the most frequently used show me files. For example, a memory area large enough to store 10 average sized show me files may be reserved in the computer's memory (e.g., a disk memory). A criteria for managing this memory area is established to fill the memory area when there is sufficient space for a new show me file, and to delete past show me files to make room for a new show me file when needed.

Since the provision of "timely" user support information is one of the benefits of the present invention, a preferred criteria for selecting a file to delete is to delete stale user support information. Stale may defined by the difference between the current date (from the operating system) and the date of the information file stored in the memory area (from the file entry in the appropriate directory or folder). For example, it may be acceptable to delete any downloaded user support file that is over one year old. The threshold for deletion may vary during the product cycle. For example, at product launch, any file over two weeks old may be regarded as stale, and a year after product launch any file over two months old may be regarded as stale. The theory is, as users ask questions of help line operators, these questions are used as a basis to update the help files provided by server 40. As the peripheral product line become more mature, fewer new questions arise and the information on server 40 does not change as often. The threshold of what is considered stale may be set by the user in a settings screen, or it may be set by the manufacturer during a down load from server 40.

The server help database for a product line with a greater number of installed products will mature faster than for a product line with fewer number of installed products. The user has available information about the date of manufacture of the particular peripheral configuration that his own peripheral has, and this can be used to determine the time elapsed since manufacture as a suggestion of how many peripherals of this configuration have been sold. However, the manufacturer is in possession of actual information on how peripheral of the particular configuration have been sold, and thus how old a user help file needs to be to be consider stale. A combination of user and manufacturer information may be used to set the "stale threshold" for deleting a stale user help file.

A second stale threshold may be used in step S22. If the information stored in memory is available but regarded stale by according to the second threshold, step S2 may proceed to step S23 anyway to download the latest update on the user help information.

As discussed above with respect to FIG. 4, the user can click on a "maintenance" button. On doing so, a maintenance screen appears, and the user can select to execute any of several self diagnostic routines. The installation software installs a diagnostic module that is more or less and executive that calls very specific sub-modules to test each part of the machine. The specific diagnotic options depends on the specific configuration of the peripheral and are downloaded from server 40 in the exact same manner as user help information is downloaded. The present invention benefits from the use of the peripheral indicia and peripheral condition to specify a URL address that exactly matches the user's peripheral and condition. In this way, diagnostics may be performed quicker. Then, when a failed part is isolated, the "buy now" button appears and a replacement part may be ordered immediately as discussed below. The user may use the "show me" button to see how to replace the part when the part arrives.

Figure 7:
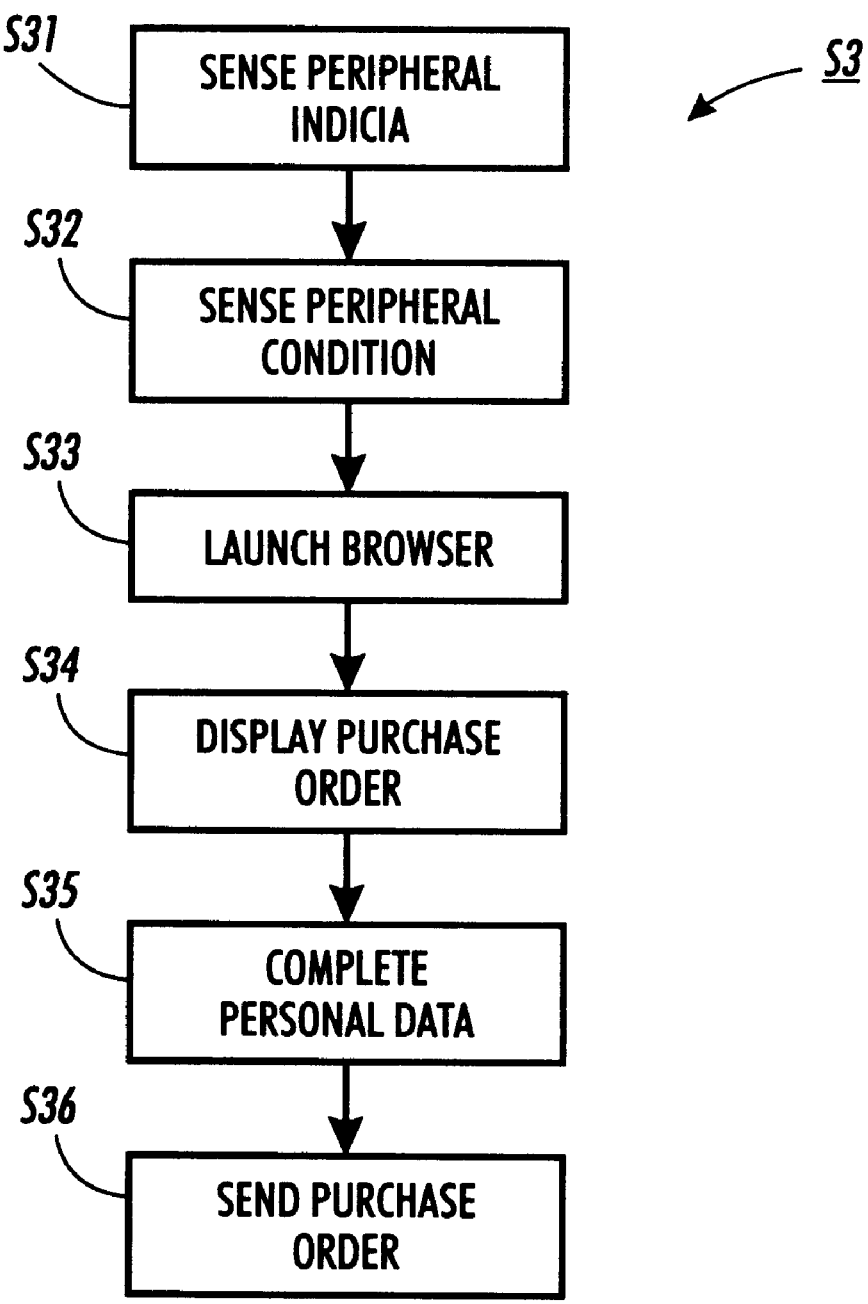
FIG. 7 is a flow chart of a online purchase order process of the invention.

When a user clicks on the "buy now" button, either from FIG. 4 or from a maintenance screen, the application program enters purchase order sequence S3 (FIG. 7). In FIG. 7, when the buy now button is clicked, the application program has already sensed the peripheral indicia S31 (as in S11, FIG. 5) and the peripheral condition S32 (as in S21, FIG. 6). Then at S33, the application program launches a browser to access a purchase order page or screen from the manufacturer's server 40 based on the peripheral indicia and the detected peripheral condition. The purchase order screen is automatically partially filled out at server 40 with the part number to be ordered based on the peripheral indicia and condition. At S34, the browser displays the screen to the user. At S35, the user selects such online purchasing options as method of shipment, payment on account or by credit card, etc. For example, the user may enter a credit card authorization and request overnight express shipment. When the user has filled out the purchase order screen, at S36 the browser sends the purchase order to the manufacturer's server (40, FIG. 2). Alternatively, when the user has filled out the purchase order screen, at S36 the application launches an e-mail module to send the purchase order data to the manufacturer's server (40, FIG. 2). When the purchase order is received at server 40, the order is confirmed on the user's browser screen or the order is confirmed by a responsive e-mail.

Alternatively, the user personal information (e.g., name, address, shipment method, etc.) may be automatically entered by the application's program. For example, this information may be entered and saved in computer 30 during online registration and modified, if necessary, using the modify settings screen. In this alternative variant, step S35 automatically enters the user personal information (including account or credit card numbers), and step S36 is a screen with a single button to confirm the desire to purchase. That is to say, the user click on the buy now button, then clicks on the confirm purchase order button (step S36) and is e-mailed a purchase or confirmation and receives the part the next day (depending on shipment instructions).

The peripheral condition is used to indicate when a consumable has been exhausted (e.g., paper tray empty) or a consumable has reach a predetermined threshold (e.g., magenta ink level low). Preferably, the peripheral condition indicates when the consumable has reached a threshold in time to reorder before the consumable is completely exhausted.

In an alternative embodiment, the application module has a monitor module that is called each time a job is sent to the printer to track how many pages have been printed and/or how much ink has been expended in each color since the last time the consumable has been replenished. The monitor module includes an "inventory sub-module" to recorded each time the consumable has been replenished and to deduct consumption of the consumable as the jobs are printed. The monitor module causes an indication of a status condition to be displayed when the consumables are expected to be below a threshold based on the inventory sub-module. The user can then navigate through the screens to the status screen and order more of the consumable by clicking the "buy now" button.

As an extension, the manufacturer's server 40 may send a shipping order to a supplier local to the user's location. Server 40 knows the address of the user from the purchase order. With pre-arranged contracts with networks of office supply retailers and mail order houses, server 40 is kept aware of the level of inventory on hand at the retailer, and can confirm availability before sending the shipment order to the retailer. In this way, server 40 performs like a salesman of the retailer and, as such, earns a commission.

Furthermore, using "cookie technology" developed for browsers, the application program examines the cookies for office supply retailers that the user has already used for supplies (e.g., when the user buys supplies online from the retailer). Such retailer can become a preferred distributor for the manufacturer's supplies. If accounts are established with the retailers that carry the desired part, the application program may inquire of the user at the time the user clicks on the "buy now" button whether the user want to order from the preferred retailer on account.

Having described preferred embodiments of a novel system and method for context sensitive web-based user support and instruction (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims.

What is claimed is:

1. A method of providing support to a user of a copier or printer system using a consumable comprising:

sensing a condition of a consumable in at least one of a copier and a printer associated with a computer; and launching a communications browser to access a server at an address defined by the condition of the consumable in at least one of the copier and the printer, the server providing the browser with additional information about the condition of the consumable in at least one of the copier and the printer; and displaying audio and video assistance to the user about the consumable of the at least one of the copier and the printer.

2. The method of claim 1, wherein launching automatically launches the communications browser when information stored in the computer does not inform about the condition of the consumable in at least one of the copier and the printer; and further comprising storing the additional information about the condition of at least one of the copier and the printer in the computer.

3. The method of claim 2, further comprising using the additional information in the computer relating to the condition of at least one of the copier and the printer for subsequent access without subsequently launching the browser.

4. The method of claim 1, wherein the additional information relating to the condition of at least one of the copier and the printer includes a flag to indicate whether the peripheral has been reported stolen, the method further comprising disabling the peripheral when the flag indicates that the peripheral has been reported stolen.

5. The method of claim 1, wherein sensing senses one of an error code and a code indicative of a consumable in at least one of the copier and the printer reaching a predetermined threshold.

6. A method of providing support to a user of a computer comprising:

sensing a indicia of a consumable in at least one of a copier and a printer at a computer;

launching a communications browser to connect to a server;

downloading from the server audio and video information about at least one of the copier and the printer based on the indicia of the consumable in at least one of the copier and the printer;

displaying a registration page including an information field for user input and indicia of at least one of the copier and the printer; and sending the registration page to a registration server resulting in registering a configuration and data of registration stored in the registration system for at least one of the copier and the printer.

7. The method of claim 6, further comprising:

sensing a condition of at least one of the copier and the printer at the computer; and launching a communications browser to access the server at an address defined by the condition of at least one of the copier and the printer, the server providing the browser with updated information about the condition of at least one of the copier and the printer.

8. The method of claim 6, further comprising:

sensing a condition of at least one of the copier and the printer at the computer; and displaying the downloaded additional information when the downloaded additional information informs about the condition of at least one of the copier and the printer.

9. The method of claim 6, further comprising:

sensing a condition of at least one of the copier and the printer at the computer; and displaying the downloaded additional information when the downloaded additional information informs about the condition of at least one of the copier and the printer and the downloaded information is dated within a predetermined period of a current date.

10. The method of claim 6, wherein sensing senses one of a model number, a part number, a serial number, a date of manufacturer and a configuration indicia of at least one of the copier and the printer.

11. A computer readable media for controlling a processor and having modules stored thereon, the media comprising:

a first module to sense a indicia of at least one of the copier and the printer at the processor;

a second module for launching a communications browser module to connect to a server; and a third module to download from the server audio and video information about the at least one of the copier and the printer based on the indicia of at least one of the copier and the printer;

displaying a registration page including an information field for user input and indicia of at least one of the copier and the printer; and sending the registration page to a registration server resulting in registering a configuration and data of registration stored in the registration system for at least one of the copier and the printer.

12. The media of claim 11, further comprising:

a fourth module to sense a condition of at least one of the copier and the printer at the processor; and a fifth module to launch a communications browser module to access the server at an address defined by the condition of at least one of the copier and the printer, the server providing the browser with updated information about the condition of at least one of the copier and the printer.

13. The media of claim 11, further comprising:

a fourth module to sense a condition of at least one of the copier and the printer at the processor; and a fifth module to display the downloaded additional information when the downloaded additional information informs about the condition of at least one of the copier and the printer.

14. The media of claim 11, further comprising:

a fourth module to sense a condition of at least one of the copier and the printer at the processor; and a fifth module to display the downloaded additional information when the downloaded additional information informs about the condition of at least one of the copier and the printer and the downloaded information is dated within a predetermined period of a current date.

15. The media of claim 11, wherein the first module includes logic to sense one of a model number, a part number, a serial number, a date of manufacturer and a configuration indicia of at least one of the copier and the printer.

* * * * *